United States Patent
Nagahara et al.

(10) Patent No.: US 10,105,993 B2
(45) Date of Patent: Oct. 23, 2018

(54) PNEUMATIC TIRE

(71) Applicant: SUMITOMO RUBBER INDUSTRIES, LTD., Kobe-shi, Hyogo (JP)

(72) Inventors: Naoya Nagahara, Kobe (JP); Hiroshi Yamaoka, Kobe (JP); Seiji Inoue, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 524 days.

(21) Appl. No.: 14/844,808

(22) Filed: Sep. 3, 2015

(65) Prior Publication Data
US 2016/0082780 A1  Mar. 24, 2016

(30) Foreign Application Priority Data

Sep. 24, 2014 (JP) .................................. 2014-194261

(51) Int. Cl.
*B60C 11/12* (2006.01)
*B60C 11/13* (2006.01)
(Continued)

(52) U.S. Cl.
CPC ........ *B60C 11/042* (2013.01); *B60C 11/0306* (2013.01); *B60C 11/1236* (2013.01);
(Continued)

(58) Field of Classification Search
CPC ............... B60C 11/1236; B60C 11/042; B60C 11/1392; B60C 2011/0381; B60C 2011/0383; B60C 2011/0365
(Continued)

(56) References Cited

U.S. PATENT DOCUMENTS

2005/0183807 A1* 8/2005 Hildebrand ......... B60C 11/0306
 152/209.2
2010/0116393 A1* 5/2010 Miyazaki ............ B60C 11/0306
 152/209.18
(Continued)

FOREIGN PATENT DOCUMENTS

EP 0 369 932 A2 5/1990
EP 2 289 714 A1 3/2011
(Continued)

OTHER PUBLICATIONS

Machine Translation: JP-2007045324-A; Sakano, Masato; (Year: 2018).*

(Continued)

*Primary Examiner* — Steven D Maki
*Assistant Examiner* — Kendra Ly
(74) *Attorney, Agent, or Firm* — Birch, Stewart, Kolasch & Birch, LLP (57) ABSTRACT

A pneumatic tire 1 has a tread portion 2 provided in a shoulder land region 5 with: axially inner shoulder sipes 8 each extending axially outwardly from a shoulder main groove 3 to its axially outer end 8e terminated within the shoulder land region 5; and axially outer shoulder sipes 9 each extending axially outwardly from its axially inner end 9i located axially outside the axially outer end 8e. The axially inner end 9i of each axially outer shoulder sipe 9 is positioned on an axially outward extension of one of the axially inner shoulder sipes 8.

10 Claims, 5 Drawing Sheets

(51) Int. Cl.
 *B60C 11/04* (2006.01)
 *B60C 11/03* (2006.01)
(52) U.S. Cl.
 CPC ... *B60C 11/1392* (2013.01); *B60C 2011/0341* (2013.01); *B60C 2011/0353* (2013.01); *B60C 2011/0355* (2013.01); *B60C 2011/0381* (2013.01); *B60C 2011/0383* (2013.01); *B60C 2011/0388* (2013.01); *B60C 2011/1209* (2013.01); *B60C 2011/1254* (2013.01)
(58) Field of Classification Search
 USPC .................................................. 152/209.18
 See application file for complete search history.

(56) References Cited

U.S. PATENT DOCUMENTS

| | | | |
|---|---|---|---|
| 2010/0212792 A1* | 8/2010 | Mita | B60C 11/0306 152/209.9 |
| 2010/0314012 A1 | 12/2010 | Hada | |
| 2013/0105051 A1 | 5/2013 | Takahashi | |
| 2013/0146192 A1 | 6/2013 | Miyoshi | |
| 2014/0238563 A1* | 8/2014 | Tanaka | B60C 11/0306 152/209.2 |

FOREIGN PATENT DOCUMENTS

| | | |
|---|---|---|
| EP | 2 732 985 A1 | 5/2014 |
| EP | 2 769 853 A1 | 8/2014 |
| EP | 2 772 370 A2 | 9/2014 |
| JP | 02179508 A * | 7/1990 |
| JP | 08048114 A * | 2/1996 |
| JP | 2007045324 A * | 2/2007 |
| JP | 2013-91479 A | 5/2013 |

OTHER PUBLICATIONS

Machine Translation: JP-08048114-A; Sakano, Masato; (Year: 2018).*
Machine Translation: JP-02179508-A; Watanabe, Susumu; (Year: 2018).*
Extended European Search Report, dated May 12, 2016, for European Application No. 15184575.7.

* cited by examiner

PNEUMATIC TIRE

BACKGROUND OF THE INVENTION

The present invention relates to a pneumatic tire, more particularly to a tread pattern capable of exhibiting good ice/snow performance and steering stability.

Studless tires provided with a block-based tread pattern including a large number of sipes are widely used as winter tires exhibiting good ice/snow performance.

In recent years, on the other hand, there is an increased demand for such winter tire exhibiting good ice/snow performance on ice or snow covered road as well as good steering stability on dry pavement.

The ground contacting elements such as blocks in the tread portion of a studless tire have relatively low rigidity due to a large number of the sipes. Therefore, the steering stability of such studless tire is not so good, especially on dry pavement.

In the Japanese Patent Application Publication No. 2010-285035 and the corresponding U.S. Patent Application Publication No. 2010-0314012-A1, there is disclosed a pneumatic tire having a tread pattern designed to improve snow performance while maintaining steering stability. However, the disclosed pneumatic tire has room for improvement in both of the snow performance and the steering stability.

SUMMARY OF THE INVENTION

It is therefore, an object of the present invention to provide a pneumatic tire improved in the ice/snow performance and steering stability on dry pavement in good balance.

According to the present invention, a pneumatic tire comprises a tread portion provided with
a pair of shoulder main grooves extending continuously in the tire circumferential direction so as to define a pair of shoulder land regions axially outside the respective shoulder main grooves,
axially inner shoulder sipes circumferentially arranged in each shoulder land region,
axially outer shoulder sipes circumferentially arranged in each shoulder land region so as to position axially outside the axially inner shoulder sipes,
wherein
in each shoulder land region,
each axially inner shoulder sipe extends from the shoulder main groove toward the tread edge, and has an axially outer end terminated within the shoulder land region, and
each axially outer shoulder sipe extends toward the tread edge from its axially inner end which is positioned substantially on an axially outward extension of one of the axially inner shoulder sipes.

Further, the pneumatic tire according to the present invention may have the following features:
(1) the above-mentioned each axially outer shoulder sipe extends on the axially outward extension;
(2) the tread portion is provided between the shoulder main grooves with at least one crown main groove extending continuously in the tire circumferential direction so as to define a pair of middle land regions between the shoulder main grooves and at least one crown main groove,
each middle land region is provided with middle grooves each having an open end opened to the crown main groove and a terminal end terminated within the middle land region, middle grooves each having an open end opened to the shoulder main groove and a terminal end terminated within the middle land region, and the width of each middle groove is gradually decreased from the open end toward the terminal end;
(3) each middle land region is provided with first middle sipes extending from the crown main groove to the shoulder main groove, and
a block piece defined between each middle groove and the adjacent first middle sipe is provided at its edge on the middle groove's open end side with a chamfered part;
(4) the middle land region is provided with second middle sipes each extending from the terminal end of one of the middle grooves to the opposite one of the crown main groove and the shoulder main groove;
(5) each shoulder land region is provided with
shoulder grooves extending axial inwardly from the tread edge and each having an axially inner end terminated within the shoulder land region, and
third shoulder sipes extending from the respective inner ends of the shoulder grooves to the shoulder main groove;
(6) the tread portion is provided between the shoulder main grooves with a pair of crown main grooves extending continuously in the tire circumferential direction so as to define a center land region between the crown main grooves,
the center land region is provided with center grooves each having an open end opened to the crown main groove and a terminal end terminated within the center land region, and
the width of the center groove is gradually decreased from the open end toward the terminal end.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

In case of passenger car tires, however, the standard pressure and standard tire load are uniformly defined by 180 kPa and 88% of the maximum tire load, respectively.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

The term "sipe" means a groove whose width is less than 2.0 mm.

The term "groove" means a groove whose width is not less than 2.0 mm.

The "width" of the groove or sipe refers to a values measured at the open top at the tread surface.

DESCRIPTION OF THE PREFERRED EMBODIMENTS

As embodiment of the present invention will now be described in detail in conjunction with the accompanying drawings.

According to the present invention, pneumatic tire 1 comprises, as usual, a tread portion 2, a pair of axially spaced bead portions, a pair of sidewall portions extending between the tread edges and the bead portions, a carcass extending between the bead portions, and a tread reinforcing belt disposed radially outside the carcass in the tread portion.

In this embodiment the pneumatic tire 1 is designed for passenger cars.

Figure 1:
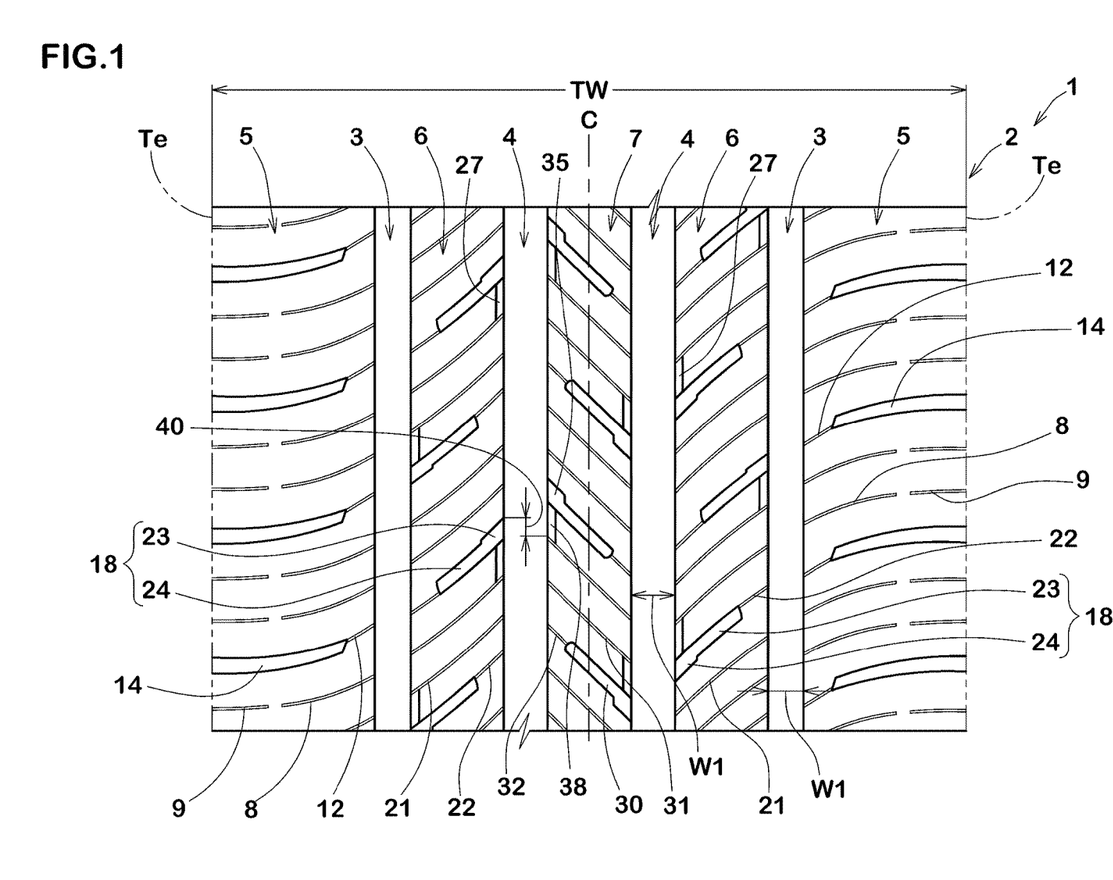
FIG. 1 is a developed partial view of the tread portion of a pneumatic tire as an embodiment of the present invention.

The tread portion 2 is provided with at least three circumferentially continuously extending main grooves. The main grooves include a pair of axially outermost shoulder main grooves 3 disposed one on each side of the tire equator c, and at least one crown main groove 4 therebetween.
In this embodiment, as shown in FIG. 1, two crown main grooves 4 are disposed one on each side of the tire equator c.

Thereby, the tread portion 2 is axially divided into a pair of shoulder land regions 5 defined between the shoulder main grooves 3 and the tread edges Te,
a pair of middle land regions 6 defined between the crown main grooves 4 and the shoulder main grooves 3, and
a center land region 7 defined between the crown main grooves 4 and disposed on the tire equator C.

Each main groove 3, 4 is a straight groove parallel with the tire circumferential direction in order that the rigidity of each land region does not decrease in the edge portions abutting on the main grooves so as to prevent the occurrence of unstable motions of the vehicle when applying brake such as wondering and one side drifting of the vehicle and thereby to improve the steering stability on dry pavement, and further, that the snow packed into the main grooves 3 and 4 can be readily self-ejected so as to improve the snow ejecting performance.

In order to improve the snow ejecting performance and the steering stability in good balance, it is preferable that the width W1 of each main groove 3, 4 is set in a range of from 2% to 9% of the tread width TW, and
the depth of the shoulder main grooves 3 and the depth Dc of the crown main grooves 4 are set in a range of from 6.5 to 8.5 mm.

Figure 2:
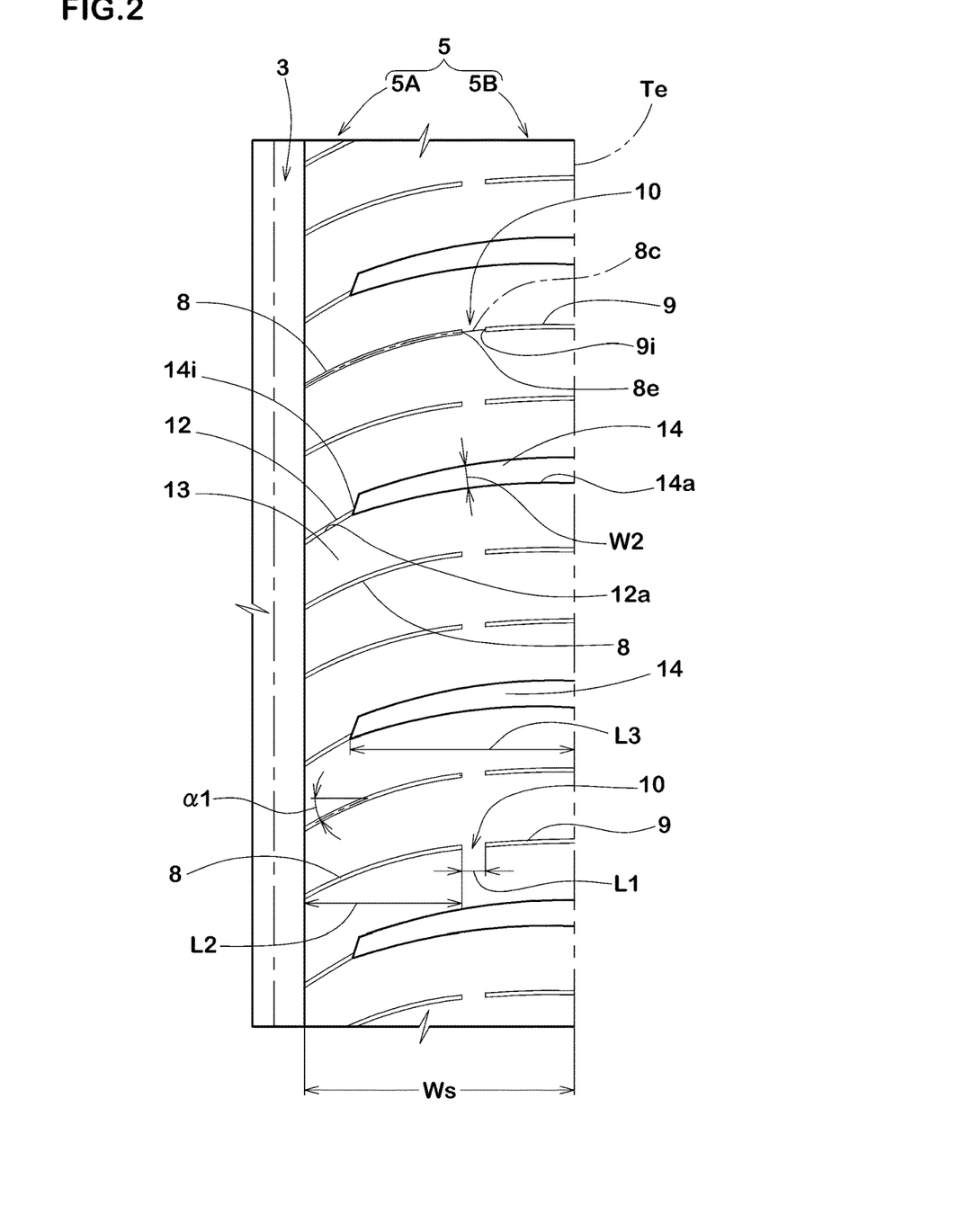
FIG. 2 is a closeup of the shoulder land region shown in FIG. 1.

Each shoulder land region 5 is provided with axially inner shoulder sipes 8, axially outer shoulder sipes 9, third shoulder sipes 12 and shoulder grooves 14 as shown in FIG. 2.

The axially inner shoulder sipe 8 extends from the shoulder main groove 3 toward the tread edge Te, and has an axially outer end 8e terminated within the shoulder land region 5.

The axially outer shoulder sipe 9 extends toward the tread edge Te from its inner end 9i located axially outside the above-mentioned axially outer end 8e of the axially inner shoulder sipe 8.

The inner end 9i of the axially outer shoulder sipe 9 is positioned substantially on an axially outward extension 8c of the axially inner shoulder sipe 8.

Here, the expression "positioned substantially on an axially outward extension 8c" means that the shortest distance from the inner end 9i to the extension 8c is at most 3 mm.

Such sipes 8 and 9 exert friction against ice or snow covered road surface and improve the ice/snow performance. Further, the steering stability on dry pavement can be improved because the axially inner shoulder sipes 8 are separated in the tire axial direction from the axially outer shoulder sipes 9, and the shoulder land region 5 maintains its high rigidity.

Preferably, at least 50% (in this example, 100%) of the length of the axially outer shoulder sipe 9 extends on the extension 8c of the axially inner shoulder sipe 8 as if one continuous sipe in order to further improve the ice/snow performance.

In this embodiment, the shoulder sipes 8 and 9 are arranged along an arc so as to exert a large frictional force.

Between the axially outer end 8e of the axially inner shoulder sipe 8 and the axially inner end 9i of the axially outer shoulder sipe 9, there is an interruption 10 of sipe. The axial dimension L1 of the interruption 10 is preferably set in a range of from 5% to 14% of the maximum axial width Ws of the shoulder land region 5.

If the axial dimension L1 is more than 14%, it becomes difficult for the sipes 8 and 9 to cooperate with each other to generate the increased frictional force. If the axial dimension L1 is less than 5%, the shoulder land region 5 can not maintain the high rigidity.

If the axial extent L2 of the axially inner shoulder sipe 8 is small, there is a possibility that the interruption 10 shifts toward the shoulder main groove 4, and the rigidity is largely decreased in a tread edge Te side which is subjected to a larger lateral force during cornering. Therefore, the length L2 of the axially inner shoulder sipe 8 is preferably set in a range of not less than 50% of the maximum axial width Ws of the shoulder land region 5.

If the axial extent L2 of the axially inner shoulder sipe 8 is excessively large, there is a possibility that the rigidity of the shoulder land region 5 becomes imbalanced between a shoulder main groove 3 side region 5A and a tread edge Te side region 5B. Therefore, the length L2 of the axially inner shoulder sipe 8 is preferably set in a range of not more than 65% of the maximum axial width Ws of the shoulder land region 5.

In this embodiment, the axially outer shoulder sipe 9 extends to the tread edge Te in order to increase the frictional force on icy/snowy road.

The depth of the axially inner shoulder sipe 8 and the depth of the axially outer shoulder sipe 9 are preferably set in a range of from 40% to 80% of the depth of the shoulder main grooves 3.

The shoulder groove 14 extends axially inwardly from the tread edge Te, and has an axially inner end 14i terminated within the shoulder land region 5 and an axially outer end opened at the tread edge Te to expedite the self-ejection of snow packed in the groove.

The width W2 of the shoulder grooves 14 is preferably set in a range of from 30% to 50% of the width W1 of the shoulder main grooves 3.

If the width W2 of the shoulder groove 14 is large, there is a possibility that the rigidity of the shoulder land region 5 becomes insufficient. If the width W2 of the shoulder groove 14 is small, a shearing force of the compacted snow at the shoulder groove decreases, and there is a possibility that the traction performance on snowy road is deteriorated.

In this embodiment, the width W2 of the shoulder groove 14 gradually increases toward the axially outside to prompt the self-ejection of the snow packed in the groove.

Preferably, the axial extent L3 of the shoulder groove 14 is set in a range of from 70% to 90% of the maximum axial width Ws of the shoulder land region 5 in order to increase the compacted snow's shearing force while securing high rigidity of the shoulder land region 5.

The third shoulder sipe 12 extends from the inner end 14i of the shoulder groove 14 to the shoulder main groove 3 to enable the shoulder groove 14 to open widely when contacting with the ground and to grasp a larger volume of snow.

In order that the shoulder land region 5 maintains high rigidity, the third shoulder sipe 12 is smoothly connected to the shoulder groove 14 such that one edge 12a of the third shoulder sipe 12 and one edge 14a of the shoulder groove 14 are arranged in line.

The depth of the third shoulder sipe 12 is preferably set in a range of from 25% to 80% of the depth of the shoulder main groove 3.

The depth of the shoulder groove 14 is preferably set in a range of from 50% to 80% of the depth of the shoulder main groove 3.

The shoulder sipes 8, 9 and 12 and the shoulder grooves 14 are inclined toward the same direction to maintain the rigidity of the shoulder land region 5.

In this embodiment, the angle α1 of each of the shoulder sipes 8, 9 and 12 and the shoulder grooves 14 with respect to the tire axial direction is gradually decreased toward the tread edge Te in order that the rigidity of the shoulder land region 5 is relatively increased in its axially outer part subjected to a larger lateral force during cornering and thereby to improve the ice/snow performance.

From this standpoint, the angle α1 of each of the shoulder sipes 8, 9 and 12 and the shoulder grooves 14 is preferably not more than 30 degrees.

Figure 3:
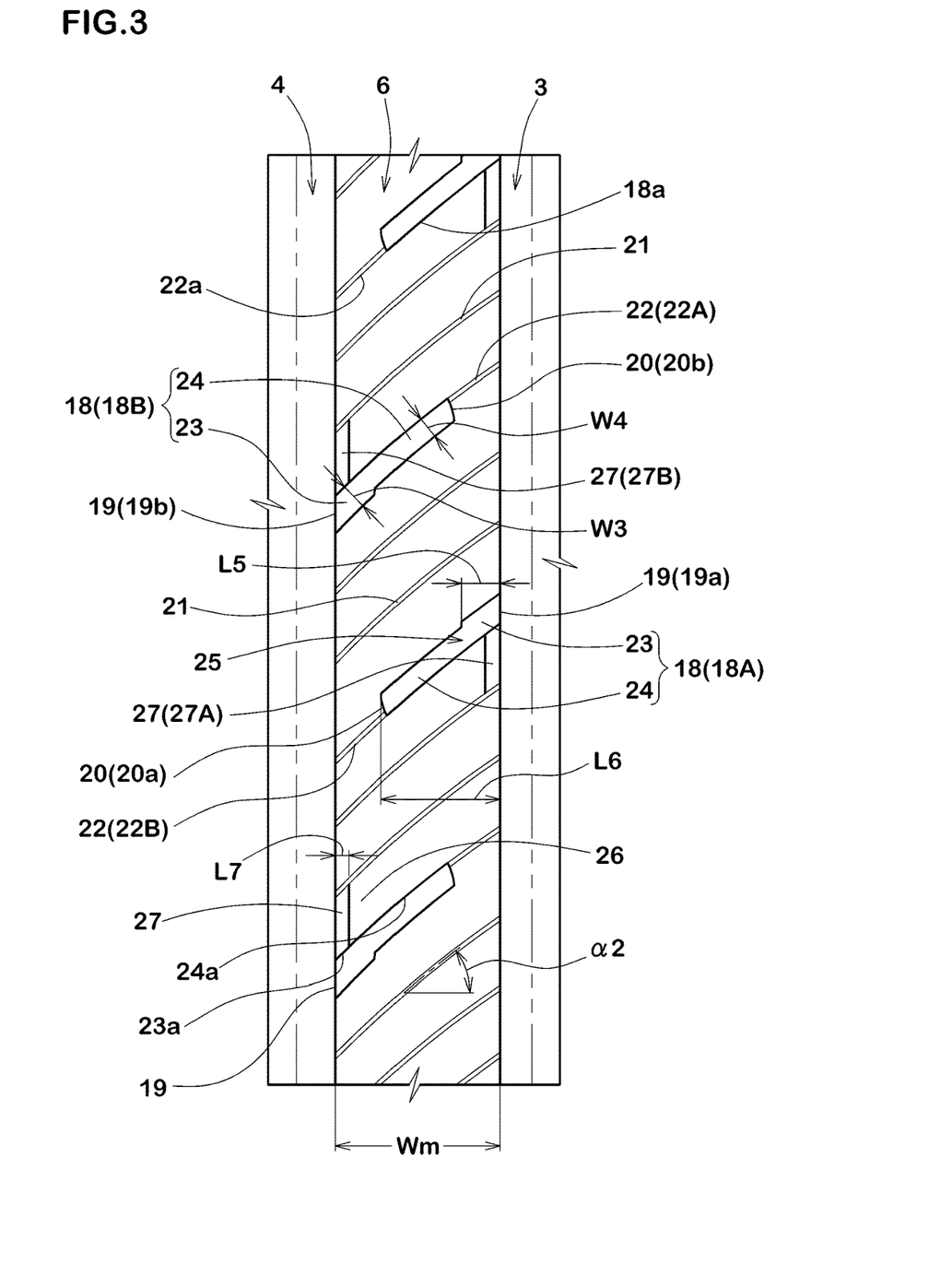
FIG. 3 is a closeup of the middle land region shown in FIG. 1.

Each middle land region 6 is provided with middle grooves 18, first middle sipes 21, and second middle sipes 22 as shown in FIG. 3.

The middle grooves 18 include first middle grooves 18A and second middle grooves 18B alternately arranged in the tire circumferential direction, wherein
the first middle groove 18A has an open end 19 an opened to the shoulder main groove 3, and a terminal end 20a terminated within the middle land region 6, and
the second middle groove 18B has an open end 19b opened to the crown main groove 4, and a terminal end 20b terminated within the middle land region 6.

Therefore, the rigidity of the middle land region 6 is balanced in the tire axial direction to maintain good steering stability and ice/snow performance.

The width of each middle groove 18 is gradually increased from the terminal end toward the open end in order to let the snow and/or water in the middle groove 18 to be discharged toward the main grooves 3 and 4.

In this embodiment, each middle groove 18 comprises a wide-width part 23 and a narrow-width part 24.

The wide-width part 23 extends from the open end toward the terminal end of the concerned middle groove 18, and the narrow-width part 24 extends from the terminal end toward the open end.

The wide-width part 23 and the narrow-width part 24 are connected with each other through a stepped width difference 25. In this embodiment, the wide-width part 23 has a constant width along its substantially entire length, and the narrow-width part 24 has a constant width along its substantially entire length.

In this embodiment, one groove edge 23a of the wide-width part 23 and one groove edge 24a of the narrow-width part 24 are arranged in line, and the other groove edge of the wide-width part 23 and the other groove edge of the narrow-width part 24 are not in-line.

The axial extent L5 of the wide-width part 23 is preferably set in a range of from 35% to 50% of the axial extent L6 of the middle groove 18.

If the axial extent L5 is less than 35% of the axial extent L6, the groove volume of the wide-width part 23 becomes decreased, and the compacted snow's shearing force is decreased. If the axial extent L5 is more than 50% of the axial extent L6, there is a possibility that the rigidity of the middle land region 6 becomes insufficient.

Preferably, the groove width W3 of the wide-width part 23 is set in a range of from 35% to 55% of the width W1 of the shoulder main groove 3 in order that the snow in the middle grooves 18 is smoothly led to the main grooves 3 and 4 without excessively decreasing the rigidity of the middle land region 6.

Preferably, the axial extent L6 of the middle groove 18 is set in a range of from 50% to 90% of the maximum width Wm of the middle land region 6 in order to increase the compacted snow's shearing force while securing the rigidity of the middle land region 6.

The first middle sipe 21 extends from the crown main groove 4 to the shoulder main groove 3.

Between every two of the first and second middle grooves 18A and 18B, two or more first middle sipes 21 (in this embodiment, two first middle sipes 21) are disposed.

The second middle sipes 22 include axially outer sipes 22A and axially inner sipes 22B.

The axially outer sipes 22A respectively extends from the terminal ends 20b of the second middle grooves 18B to the shoulder main groove 3, and
the axially inner sipes 22B respectively extends from the terminal ends 20a of the first middle grooves 18A to the crown main groove 4 in order to enable the middle groove 18 to open widely when contacting with the ground and to grasp a larger volume of snow, and thereby to increase the compacted snow's shearing force.

In order that the middle land region 6 maintains high rigidity, the second middle sipes 22 are smoothly connected to the middle grooves 18 such that one edge 22a of the second middle sipe 22 and one edge 18a of the middle groove 18 are arranged in line, and the other edge of the second middle sipe 22 and the other edge of the middle groove 18 are not in-line.

The middle grooves 18, the first middle sipes 21 and the second middle sipes 22 are inclined toward the same direction to maintain the rigidity of the middle land region 6.

In this embodiment, the angle $\alpha 2$ of each of the middle sipes 21 and 22 and the middle grooves 18 with respect to the tire axial direction is gradually decreased toward the tread edge Te in order that the rigidity of the middle land region 6 is relatively increased in its axially outer part subjected to a large lateral force during cornering, and thereby to improve the ice/snow performance.

During straight running, the middle land region 6 is applied by large ground pressure in comparison with the shoulder land region 5. It is therefore, preferable that the angle $\alpha 2$ of the middle sipes 21 and 22 and the middle grooves 18 is more than the angle $\alpha 1$ of the axially inner shoulder sipes 8. The angle $\alpha 2$ of the middle sipes 21 and 22 and the middle grooves 18 is preferably 30 to 45 degrees.

The depth D1 of the first middle sipe 21 and the depth of the second middle sipe 22 are preferably set in a range of from 25% to 80% of the depth of the shoulder main groove 3.

The depth of the middle groove 18 is preferably set in a range of from 50% to 80% of the depth of the shoulder main groove 3.

Each middle land region 6 comprises middle block pieces 26 defined between the middle grooves 18 and the adjacent first middle sipes 21.

The middle block piece 26 is provided at the edge on the middle groove 18's open end 19 side with a middle chamfered part 27 inclined radially inwardly toward the adjacent main groove 3, 4. The middle chamfered part 27 is formed along the entire length of the above-mentioned edge of the middle block piece 26. Thereby, uneven wear starting from the acute-angled corner formed between the middle groove 18 and the main groove and expanding along the above-mentioned edge can be effectively prevented. This helps to maintain good steering stability.

The middle chamfered parts 27 include first middle chamfered parts 27A adjacent to the respective first middle grooves 18A, and second middle chamfered parts 27B adjacent to the respective second middle grooves 18B.

Therefore, the rigidity of the middle land region 6 is balanced in the tire axial direction to maintain good ice/snow performance and steering stability.

If the middle chamfered part 27 extends to reach to the narrow-width part 24 of the middle groove 18, the ground contacting area of the middle land region 6 becomes insufficient and the steering stability is deteriorated.

In this embodiment, therefore, the middle chamfered part 27 is formed within the axial extent of the wide-width part 23 of the middle groove 18.

Preferably, the axial extent L7 of the middle chamfered part 27 is 1 to 4 mm.

The maximum radial extent of the middle chamfered part 27 is preferably 15% to 80% of the depth Dc of the crown main groove 4.

Figure 4:
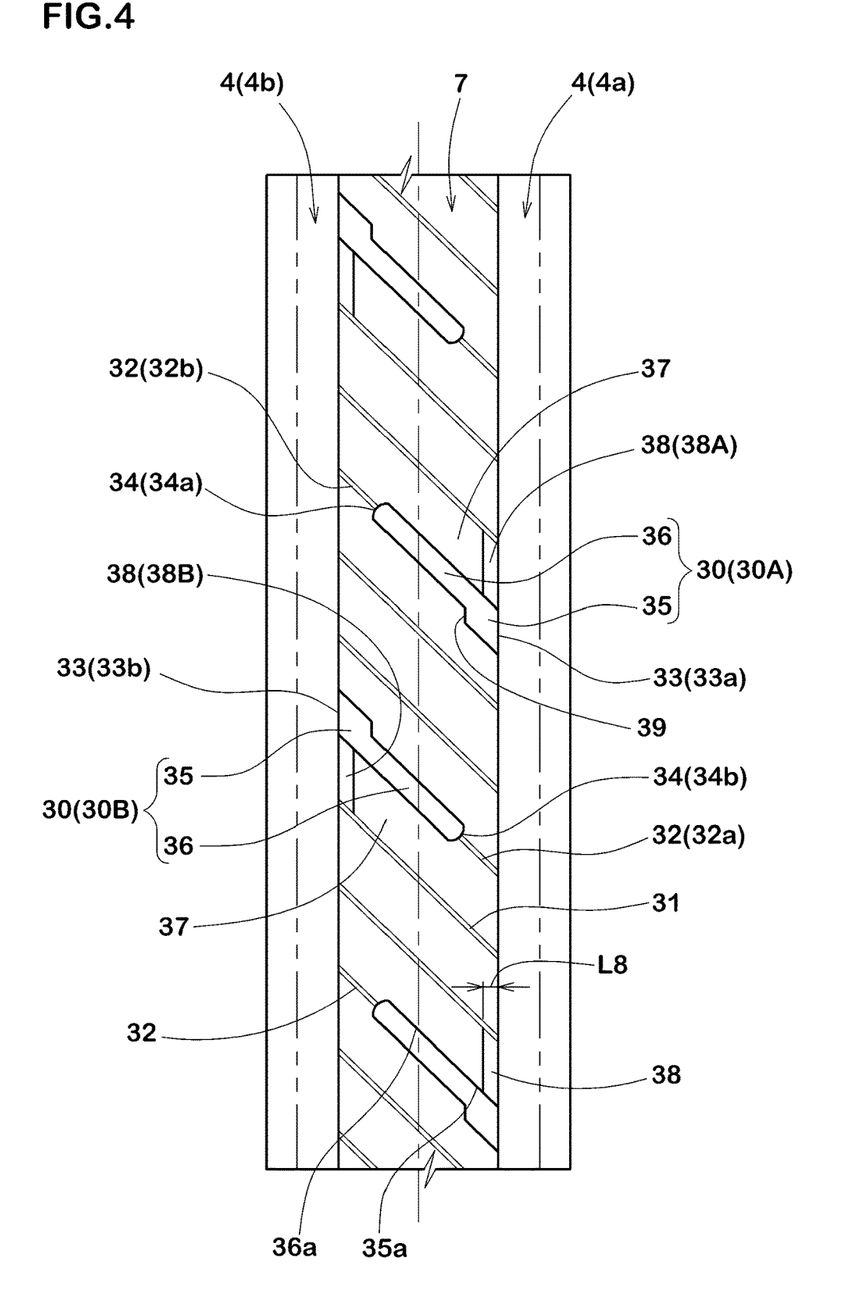
FIG. 4 is a closeup of the center land region shown in FIG. 1.

Each center land region 7 is provided with center grooves 30, first center sipes 31 and second center sipes 32 as shown in FIG. 4.

The center grooves 30 include first center grooves 30A and second center grooves 30B alternately arranged in the tire circumferential direction, wherein the first center groove 30A has an open end 33a opened to one crown main groove 4a and a terminal end 34a terminated within the center land region 7, and the second center groove 30B has an open end 33b opened to the other crown main groove 4b a terminal end 34b terminated within the center land region 7.

Thereby, the rigidity of the center land region 7 is maintained to provide good steering stability.

The width of the center groove 30 is gradually increased from the terminal end toward the open end in order to let the snow and/or water in the center groove 30 to be discharged toward the crown main grooves 4.

In this embodiment, the center groove 30 comprises a wide-width part 35 and a narrow-width part 36.

The wide-width part 35 extends from the open end toward the terminal end of the concerned center groove 30, and the narrow-width part 36 extends from the terminal end toward the open end.

The wide-width part 35 and the narrow-width part 36 are connected with each other through a stepped width difference 39. In this embodiment, the wide-width part 35 has a constant width along its substantially entire length, and the narrow-width part 36 has a constant width along its substantially entire length.

In this embodiment, one edge 35a of the wide-width part 35 and one edge 36a of the narrow-width part 36 are arranged in line, and the other edge of the wide-width part 35 and the other edge of the narrow-width part 36 are not in-line.

The first center sipe 31 extends from one of the crown main grooves 4 to the other.

Between every two of the first and second center grooves 30A and 30B, two or more first center sipes 31 (in this embodiment, two first center sipes 31) are disposed.

In order to enable the center groove 30 to open widely when contacting with the ground and to grasp a larger volume of snow, and thereby to increase the compacted snow's shearing force, the second center sipes 32 include second center sipes 32a extending from the second center grooves 30B to the crown main groove 4a, and second center sipes 32b extending from the first center grooves 30A to the crown main groove 4b.

The center grooves 30, the first center sipes 31 and the second center sipes 32 are inclined toward the same direction. In this embodiment, the center grooves 30, the first center sipes 31 and the second center sipes 32 have the same angle $\alpha 3$ with respect to the tire axial direction in order to secure high rigidity of the center land region 7.

Toward one tread edge from the other tread edge, the center grooves 30 are inclined to one tire circumferential direction, whereas the middle grooves 18 are inclined to the other tire circumferential direction.

Thereby, a lateral force caused by the center grooves 30 and a lateral force caused by the middle grooves 18 are counterbalanced, and the straight running stability on icy/snowy road and on dry pavement can be improved.

For that purpose, it is preferable to set the angles $\alpha 3$ of the center sipes 31 and 32 and the center grooves 30 in a range of from 35 to 50 degrees.

The depth of the first center sipe 31 and the depth of the second center sipe 32 are preferably set in a range of from 25% to 80% of the depth of the shoulder main groove 3.

The depth D2 of the center groove 30 is preferably set in a range of from 50% to 80% of the depth of the shoulder main groove 3.

The center land region 7 comprises center block pieces 37 defined between the center grooves 30 and the adjacent first center sipes 31.

The center block piece 37 is provided at the edge on the center groove 30's open end 33 side with a center chamfered part 38 inclined radially inwardly toward the adjacent crown main groove 4.

The center chamfered part 38 is formed along the entire length of the above-mentioned edge of the center block piece 37. Therefore, uneven wear starting from the acute-angled corner formed between the center groove 30 and the main groove and expanding along the above-mentioned edge can be effectively prevented. This helps to maintain good steering stability.

The center chamfered parts 38 include first center chamfered parts 38A adjacent to the first center grooves 30A, and second center chamfered parts 38B adjacent to the second center grooves 30B. Therefore, the rigidity of the center land region 7 is balanced in the tire axial direction to maintain good ice/snow performance and steering stability.

If the center chamfered part 38 extends to reach to the narrow-width part 36 of the center groove 30, the ground contacting area of the center land region 7 becomes insufficient and the steering stability is deteriorated.

In this embodiment, therefore, the center chamfered part 38 is formed within the axial extent of the wide-width part 35 of the center groove 30.

Preferably, the axial extent L8 of the center chamfered part 38 is set in a range of from 1 to 4 mm.

The maximum radial extent D3 of the center chamfered part 38 is preferably in a range of from 15% to 80% of the depth Dc of the crown main groove 4.

Figure 5:
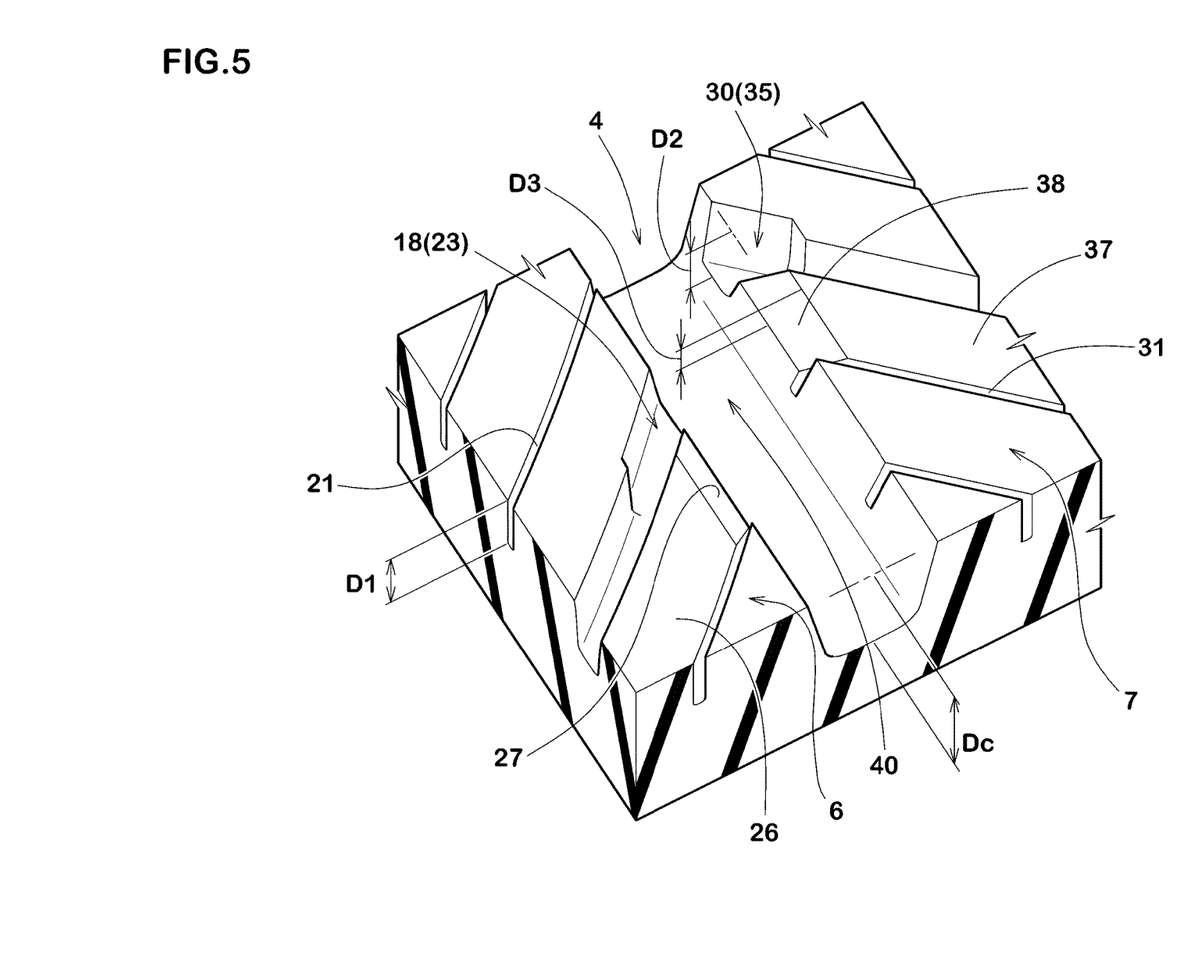
FIG. 5 is a perspective view showing the middle chamfered part and its vicinity.

In this embodiment, as shown in FIG. 1 and FIG. 5, each of the center chamfered parts 38 of the center block pieces 37 faces one of the wide-width parts 23 of the middle grooves 18 through the crown main groove 4 so that they have an overlap 40 in the tire circumferential direction.

But, in this embodiment, the wide-width part 23 of the middle groove 18 concerned is not overlapped in the tire circumferential direction with the wide-width part 35 of the center groove 30 adjacent to the center chamfered part 38 concerned.

By providing such overlap 40, as shown in FIG. 5, at the intersection of the wide-width part 23 with the crown main groove 4, a large volume of void is formed by the wide-width part 23, the crown main groove 4, the center chamfered part 38 and the wide-width part 35 of the center groove 30. As a result, snow compressed into such void can exert a large shearing force, and thereby the ice/snow performance can be further improved.

While description has been made of one particularly preferable embodiment of the present invention, the illustrated embodiment should not be construed as to limit the scope of the present invention; various modifications are possible without departing from the scope of the present invention.

Comparison Tests

Based on the tread pattern shown in FIG. 1, pneumatic tires of size 215/60R16 (Rim size: 16×6J) having specifications listed in Table 1 were experimentally manufactured and tested for the ice/snow performance and steering stability.

Common specifications are as follows:
tread width TW: 166 mm
middle chamfered part axial extent: 2 mm
    radial extent: 2 mm
center chamfered part axial extent: 2 mm
    radial extent: 2 mm
middle groove depth: 6 mm
center groove depth: 6 mm <Ice/Snow Performance and Steering Stability>

Each test tire was mounted on all of four wheels of a 1800 cc front wheel drive passenger car (tire pressure: 210 kPa), and during running on an ice/snow covered road surface in a tire test course and on a drying asphalt road surface in a tire test course, the test driver evaluated the ice/snow performance and steering stability based on the steering response, traction, road grip and the like.

The results are indicated in Table 1 by an index based on the comparative example tire Ref. 1 being 100, wherein the larger the value, the better the performance.

From the test results, it was confirmed that, in comparison with the comparative example tire Ref. 1, the embodiment tires were improved in the ice/snow performance and steering stability in good balance.

TABLE 1

| Tire | Ref. 1 | Ex. 1 | Ex. 2 | Ex. 3 | Ex. 4 | Ex. 5 | Ex. 6 |
|---|---|---|---|---|---|---|---|
| interruption L1/Ws (%) | *1 | 8 | 3 | 5 | 14 | 16 | 8 |
| axially inner shoulder sipe length L2/Ws (%) | 92 | 60 | 60 | 60 | 60 | 60 | 45 |
| middle groove length L6/Wm (%) | 75 | 75 | 75 | 75 | 75 | 75 | 75 |
| middle groove wide-width part length L5/L6 (%) | 40 | 40 | 40 | 40 | 40 | 40 | 40 |
| ice/snow performance | 100 | 110 | 111 | 110 | 109 | 107 | 108 |
| steering stability | 100 | 103 | 100 | 102 | 103 | 104 | 102 |

| Tire | Ex. 7 | Ex. 8 | Ex. 9 | Ex. 10 | Ex. 11 | Ex. 12 | Ex. 13 |
|---|---|---|---|---|---|---|---|
| interruption L1/Ws (%) | 8 | 8 | 8 | 8 | 8 | 8 | 8 |
| axially inner shoulder sipe length L2/Ws (%) | 50 | 65 | 70 | 60 | 60 | 60 | 60 |
| middle groove length L6/Wm (%) | 75 | 75 | 75 | 50 | 95 | 75 | 75 |
| middle groove wide-width part length L5/L6 (%) | 40 | 40 | 40 | 40 | 40 | 30 | 50 |
| ice/snow performance | 109 | 109 | 108 | 106 | 111 | 107 | 111 |
| steering stability | 103 | 102 | 102 | 105 | 101 | 104 | 101 |

*1 The axially outer shoulder sipes 9 were not formed.

REFERENCE SIGNS LIST 1 pneumatic tire
2 tread portion
3 shoulder main groove
5 shoulder land region
8 axially inner shoulder sipe
8e outer end
9 axially outer shoulder sipe
9i inner end
Te tread edge

The invention claimed is:

1. A pneumatic tire comprising a tread portion provided with:
   a pair of shoulder main grooves extending continuously in the tire circumferential direction so as to define a pair of shoulder land regions axially outside the respective shoulder main grooves,
   axially inner shoulder sipes circumferentially arranged in each shoulder land region, and
   axially outer shoulder sipes circumferentially arranged in each shoulder land region so as to position axially outside the axially inner shoulder sipes,
   wherein
      in each shoulder land region, each axially inner shoulder sipe extends from the shoulder main groove toward the tread edge, and has an axially outer end within the shoulder land region,
      each axially outer shoulder sipe extends toward the tread edge from its axially inner end which is positioned substantially on an axially outward extension of one of the axially inner shoulder sipes,
      the tread portion is provided between the shoulder main grooves with at least one crown main groove extending continuously in the tire circumferential direction so as to define a pair of middle land regions between the shoulder main grooves and the at least one crown main groove,
      each of the middle land regions is provided with:
         middle grooves each having an open end opened to the crown main groove and a terminal end terminated within the middle land region, and
         middle grooves each having an open end opened to the shoulder main groove and a terminal end terminated within the middle land region, and
      a width of each of the middle grooves is gradually decreased from the open end toward the terminal end,
      each of the middle land regions is provided with first middle sipes extending from the crown main groove to the shoulder main groove, and
      a block piece defined between each of the middle grooves and the adjacent first middle sipe is provided at its edge on the middle groove's open end side with a chamfered part.

2. The pneumatic tire according to claim 1, wherein said each axially outer shoulder sipe extends on the axially outward extension.

3. The pneumatic tire according to claim 2, wherein each shoulder land region is provided with shoulder grooves extending axial inwardly from the tread edge and each having an axially inner end terminated within the shoulder land region, and third shoulder sipes extending from the respective inner ends of the shoulder grooves to the shoulder main groove.

4. The pneumatic tire according to claim 2, wherein said at least one crown main groove between the shoulder main grooves is a pair of crown main grooves defining a center land region between the crown main grooves, the center land region is provided with center grooves each having an open end opened to one of the crown main grooves and a terminal end terminated within the center land region, and having a width gradually decreased from the open end toward the terminal end.

5. The pneumatic tire according to claim 1, wherein the middle land regions are each provided with second middle sipes each extending from the terminal end of one of the middle grooves to the opposite one of the crown main groove and the shoulder main groove.

6. The pneumatic tire according to claim 5, wherein each shoulder land region is provided with shoulder grooves extending axial inwardly from the tread edge and each having an axially inner end terminated within the shoulder land region, and third shoulder sipes extending from the respective inner ends of the shoulder grooves to the shoulder main groove.

7. The pneumatic tire according to claim 5, wherein said at least one crown main groove between the shoulder main grooves is a pair of crown main grooves defining a center land region between the crown main grooves, the center land region is provided with center grooves each having an open end opened to one of the crown main grooves and a terminal end terminated within the center land region, and having a width gradually decreased from the open end toward the terminal end.

8. The pneumatic tire according to claim 1, wherein each shoulder land region is provided with shoulder grooves extending axial inwardly from the tread edge and each having an axially inner end terminated within the shoulder land region, and third shoulder sipes extending from the respective inner ends of the shoulder grooves to the shoulder main groove.

9. The pneumatic tire according to claim 8, wherein said at least one crown main groove between the shoulder main grooves is a pair of crown main grooves defining a center land region between the crown main grooves, the center land region is provided with center grooves each having an open end opened to one of the crown main grooves and a terminal end terminated within the center land region, and having a width gradually decreased from the open end toward the terminal end.

10. The pneumatic tire according to claim 1, wherein said at least one crown main groove between the shoulder main grooves is a pair of crown main grooves defining a center land region between the crown main grooves, the center land region is provided with center grooves each having an open end opened to one of the crown main grooves and a terminal end terminated within the center land region, and having a width gradually decreased from the open end toward the terminal end.

* * * * *